United States Patent [19]
Fitton et al.

[11] 3,855,338
[45] Dec. 17, 1974

[54] PREPARATION OF 6-METHYL-1,5-HEPTADIENE

[75] Inventors: Peter Fitton, Pequannock, N.J.; Thomas Whitesides, Madison, Wis.

[73] Assignee: Hoffmann-LaRoche Inc., Nutley, N.J.

[22] Filed: Oct. 24, 1973

[21] Appl. No.: 409,122

[52] U.S. Cl........... 260/680 R, 252/430, 260/677 R
[51] Int. Cl............................................... C07c 3/62
[58] Field of Search........ 260/680 R, 683 D, 677 R; 252/430

[56] References Cited
UNITED STATES PATENTS

| | | | |
|---|---|---|---|
| 3,424,811 | 1/1969 | Mango | 260/680 R |
| 3,671,462 | 6/1972 | O'Hara et al. | 260/683 D |
| 3,715,410 | 2/1973 | Ray et al. | 260/680 R |

Primary Examiner—Paul M. Coughlan, Jr.
Attorney, Agent, or Firm—Samuel L. Welt; Jon S. Saxe; William H. Epstein

[57] ABSTRACT

A process of producing 6-methyl-1,5-heptadiene by reacting isobutylene with an aliphatic or cycloaliphatic 1,5-diene containing at least 6 carbon atoms in the presence of a catalyst system containing activated rhenium oxide deposited on alumina and a tera(lower alkyl)metal compound.

11 Claims, No Drawings

PREPARATION OF 6-METHYL-1,5-HEPTADIENE

BACKGROUND OF THE INVENTION

The compound 6-methyl-1,5-heptadiene is a valuable intermediate for such compounds as 6-methyl-5-hepten-2-one utilized in the production of vitamins and carotenoids. See U.S. Pat. application Ser. No. 272,516, filed July 17, 1972, Fitton et al.

In the past, 6-methyl-1,5-heptadiene has been synthesized as disclosed in Henne et al., J.A.C.S., 64 392 (1944) by reacting prenyl chloride and allyl chloride in the presence of magnesium. This process has suffered from the disadvantage that the 6-methyl-1,5-heptadiene is produced in low yields in combination with many side products. Furthermore, this process has proven to be very expensive due to the need of utilizing stoichiometric amounts of magnesium and the poor efficiency encountered in converting the starting materials to the desired product.

Another method which could be applied to the preparation of 6-methyl-1,5-heptadiene is by the disproportionation of olefins utilizing catalysts such as activated rhenium oxide on alumina as disclosed in British Pat. No. 1,105,563, Howman et al., British Pat. No. 1,174,968, Alkema et al. and U.S. Pat. No. 3,658,927, Apr. 25, 1972, Crain et al. The disproportionation of olefins involves the catalytic rearrangement of the olefins around the double bond contained therein, producing a multiplicity of products. The drawback of this procedure is that the 6-methyl-1,5-heptadiene which, if produced at all, is produced in poor yields, in combination with various other olefins. Furthermore, it was found that it was difficult to separate this compound from the various other olefinic compounds contained in this mixture. In view of the fact that it has been difficult and expensive to produce 6-methyl-1,5-heptadiene, this compound has not found extensive use as an intermediate. Therefore, it has long been desired to provide a more efficient and cheaper method for the preparation of 6-methyl-1,5-heptadiene.

SUMMARY OF THE INVENTION

In accordance with this invention, it has been found that when an olefinic component containing a compound of the formula:

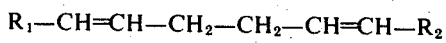

wherein $R_1$ and $R_2$ are independently selected from the group consisting of hydrogen, lower alkyl or $R_3$—CH=CH—CH$_2$—CH$_2$— or taken together form a lower alkylene or —CH$_2$—CH$_2$—CH=CH—CH$_2$—CH$_2$—; and $R_3$ is lower alkyl; or mixtures of a compound of formula I is reacted with isobutene, i.e., a compound of the formula:

in the presence of a catalyst system containing activated rhenium oxide deposited on alumina and a tetra(lower alkyl)metal compound of the formula:

wherein $R_4$ is lower alkyl; and Y is a Group IV-A metal; a mixture is produced having a high content of 6-methyl-1,5-heptadiene and from which 6-methyl-1,5-heptadiene can be easily isolated.

The mixture which is produced by the process of this invention has a high 6-methyl-1,5-heptadiene content. Furthermore, the olefinic products which are contained in this mixture can be easily separated from the desired 6-methyl-1,5-heptadiene by fractional distillation. In addition, many of the side products produced by the reaction of this invention can be recycled to react with the compound of formula II to produce additional 6-methyl-1,5-heptadiene. The phenomena whereby the disproportionation reaction of a compound of formula I with a compound of formula II to produce an olefinic mixture having a high 6-methyl-1,5-heptadiene content can be directly attributable to the use of a catalyst system containing an activated rhenium oxide deposited on alumina and a tetra(lower alkyl)metal compound of the formula III. This can be seen by the fact that where a catalyst system containing an oxide of a metal other than rhenium is utilized or the compound of formula III is omitted from the reaction, the disproportionation reaction will not produce a mixture having a high 6-methyl-1,5-heptadiene content. Furthermore, if any of the components of the catalyst system are changed or omitted, isomerization occurs and side products form which cannot be easily separated from the 6-methyl-1,5-heptadiene product.

Therefore, the process of this invention provides an economic and efficient method for producing 6-methyl-1,5-heptadiene.

DETAILED DESCRIPTION OF THE INVENTION

As used throughout this application, the term "lower alkyl" comprehends both straight and branched chain saturated hydrocarbon groups containing from 1 to 7 carbon atoms such as methyl, ethyl, n-propyl, isopropyl, etc. As used throughout this application, the term "halogen" includes all four halogens such as bromine, chlorine, fluorine and iodine, with chlorine, bromine and fluorine being preferred. The term "lower alkylene" comprehends polymethylene chains containing from 2 to 7 carbon atoms such as tetramethylene and pentamethylene. In the compound of formula III, any conventional Group IV-A metal can be utilized. Among the preferred metals are included tin, Germanium and lead, with tin being especially preferred.

The catalyst of rhenium oxide, i.e., rhenium heptoxide and alumina contains from about 0.1 to 40 parts by weight of the oxide to 100 parts by weight of the alumina. The rhenium oxide can be activated by conventional means such as by subjecting the rhenium oxide to thermal treatment either in a stream of inert gas such as nitrogen, carbon dioxide or helium, or preferably in a stream of air or oxygen followed by final treatment with an inert gas. Suitably, the catalyst is first treated with air at a temperature in the range of from about 300° to about 900°C., preferably from 300° to 600°C. for 1 minute to 20 hours and then under similar conditions with an inert gas such as nitrogen.

The activated rhenium oxide-alumina catalyst is prepared by conventional means such as disclosed in British Pat. No. 1,105,563, Howman et al. Among the preferred methods of preparing this catalyst is by mixing a solution of ammonium perrhenate and alumina and heating this mixture to convert the perrhenate to the heptoxide. In accordance with another embodiment of preparing this catalyst, the alumina can be impregnated with a solution of rhenium heptoxide in an inert organic solvent and the solvent removed by conventional means such as evaporation. Among the preferred solvents are the volatile organic solvents which include lower alkanols preferably lower alkanols containing from 1 to 4 carbon atoms such as methanol, ethanol, etc., as well as aliphatic ketones and ethers having from 1 to 4 carbon atoms, dioxane and tetrahydropyran. However, in forming this catalyst, any conventional inert organic solvent can be utilized. This catalyst can be activated by conventional means such as described hereinbefore by heating the catalyst to a temperature of from about 300° to about 900°C., preferably from about 300° to about 600°C.

The process of this invention is carried out by reacting isobutene with the compound of formula I in the presence of the catalyst system containing activated rhenium oxide deposited on alumina and the compound of formula III. In carrying out this reaction, a compound of formula I can be utillized or mixtures of compounds of the formula I can be utilized as the starting material. In carrying out this reaction, the isobutene can be utilized as the solvent medium. On the other hand, inert organic solvents can also be present in the reaction medium. If desired, any conventional inert organic solvent can be added to the reaction medium. Among the inert organic solvents which can be utilized are included hydrocarbons such as butane, benzene, toluene, pentane, hexane, etc.

In carrying out this reaction, the temperature and pressure is regulated to maintain the isobutene in the liquid phase. Therefore, any combination of temperatures and pressures which will maintain isobutene in a liquid phase can be utilized in carrying out this reaction. Among the preferred temperatures for carrying out this reaction are temperatures of from -20°C. to 85°C. Among the preferred pressures for utilization in this reaction are pressures from atmospheric pressure (15 pounds per square inch gauge) to about 300 pounds per square inch gauge. If desired, temperatures above 80°C. and pressures above 300 pounds per square inch gauge can be utilized to carry out this reaction. However, since the utilization of such high temperatures and pressures are expensive, it is not generally economically feasible to utilize such high temperatures and pressures.

The olefin of formula I which can be reacted with isobutene to prepare 6-methyl-1,5-heptadiene can be a single olefin or a mixture of olefins of the formula I. This component can also contain olefins other than the compound of formula I. Since these other olefins are converted to products other than 6-methyl-1,5-heptadiene, the presence of olefins having a formula other than formula I is not very advantageous. This is true since the disproportionation products produced by olefins other than the compound of formula I will provide separation problems. Among the olefins of the compound of formula I which can be utilized in accordance with this invention are included:

1,5-hexadiene;
cyclo-octa-1,5-diene;
1,5,9-cyclododecatriene;
1,5,9-decatriene;
1,5-cyclododecadiene;
1,5-decadiene; and
1,5-dodecadiene.

In carrying out the process of this invention, the catalyst system containing the activated rhenium oxide on alumina and the tetra (lower alkyl) metal compound can be present in the reaction medium in catalytic quantities. The catalyst system of this invention can be present in any amount conventional for catalysts in catalytic reactions. Generally, it is preferred that the catalyst system be present in an amount of at least 0.01 percent by weight based upon the weight of the olefin component. In carrying out this reaction, the catalyst system is generally utilized in an amount of from 0.01 percent to 50 percent by weight, based upon the weight of the olefinic component with amounts of from about 1 percent to about 25 percent being preferred. On the other hand, amounts far in excess of 50 percent by weight, based upon the weight of the olefinic component, i.e., amounts of 50 percent or even greater, can be utilized in this reaction. However, in view of the fact that no beneficial results are obtained by utilizing these large amounts of catalyst, and in view of the added expense of utilizing large amounts of catalyst, these large amounts of catalyst are seldom utilized in carrying out the claimed reaction. If desired, the catalyst system can contain other carrier materials in addition to the alumina. Any conventional inert carrier material can be utilized in the catalyst system if desired. Among the preferred carrier materials are included charcoal and carbon. However, in accordance with the preferred embodiment of this invention, the alumina is the only carrier material for the activated rhenium oxide.

In the catalyst system, the tetra(lower alkyl)metal compound is present in an amount of from 0.1 percent by weight based upon the weight of the catalyst system with the remainder of the catalyst system being activated rhenium oxide an alumina. Generally, it is preferred to utilize the catalyst system containing from about 0.1 percent by weight to about 60 percent by weight of tetra(lower alkyl)metal compound with the remainder being activated rhenium oxide on alumina. Among the catalyst systems particularly preferred for use in this invention is a catalyst system which contains from about 1 percent to 20 percent by weight based upon the weight of the catalyst system, of the tetra(lower alkyl)metal compound with the remainder being activated rhenium oxide on alumina.

The reaction is carried out by first forming the activated rhenium oxide on alumina catalyst in the aforementioned manner. The catalyst is then placed in a reaction vessel and the olefin feed and the isobutene are then fed to the vessel. The tetra(lower alkyl)metal compound of formula III can be fed into the reaction medium along with the feeds or can be placed in the vessel before the feeds are introduced therein. The disproportionation reaction to produce 6-methyl-1,5-heptadiene will take place almost immediately upon introducing both the olefin component and the isobutene into the reaction medium containing the catalyst system. Generally, for better yields it is preferred to carry out the reaction for a period of from 15 minutes to 60 hours, with times of from 1 hour to 24 hours being especially preferred. If desired, this reaction can be carried out for periods greater than 60 hours. However, since there is no advantage of utilizing such long reaction times, these reaction times are seldom utilized.

The reaction product contains 6-methyl-1,5-heptadiene in combination with other alkadienes. In view of the fact that this reaction produces alkadienes which can be easily separated from 6-methyl-1,5-heptadiene, the 6-methyl-1,5-heptadiene can be separated very easily from the reaction product produced in accordance with this invention. Any conventional method of separation can be utilized to recover pure 6-methyl-1,5-heptadiene from the reaction product produced in accordance with this invention. Among the preferred methods of separation are included fractional distillation. Any conventional method of fractional distillation can be utilized in accordance with this invention. The resulting reaction product of this invention after separation of the 6-methyl-1,5-heptadiene contains other 1,5-alkadienes. Therefore, this reaction product can be reutilized as the olefin feed to react with additional isobutene so as to further increase the yield of 6-methyl-1,5-heptadiene.

The following examples are illustrative of the invention. All temperatures are in degrees centigrade (°C.). All percent are percent by weight.

EXAMPLE 1

A catalyst was prepared by dissolving $Re_2O_7$ (8g.) in 200 ml. of water and adding this solution to alumina (100 g.). The water was evaporated and the catalyst dried at 110°C./30 mmHg. overnight.

15 g. of this catalyst was loaded into a stainless steel reactor tube and heated to 580°C. for 1 hour in air and then for 2 hours under nitrogen. The reactor was cooled to 60°C. and a mixture of isobutene (48.3g.) and 1,5-hexadiene (16.1 g.) was passed through the reactor and collected in a dry-ice trap. Anaylsis of the reaction product by glc showed the presence of 2.3 percent by weight of 6-methyl-1,5-heptadiene and 4.2 percent of 1,5,9-decatriene.

EXAMPLE 2

25 g. of the catalyst, as in Example 1, was loaded into a stainless steel reactor tube, activated as in Example 1, and then cooled to 40°C. A mixture of isobutene (500 g.) and 1,5-hexadiene (82 g.) was then fed through the tube at 80 psig. and at a rate of 2 grams per gram of catalyst per hour. Samples of the effluent were taken every 30 minutes and, after evaporation of the isobutene, analyzed by glc. The first six samples showed the following product distribution:

| Sample | Percent by weight 6-methyl-1,5-heptadiene | Percent by weight 1,5,9-decatriene |
|---|---|---|
| 1 | 1.3 | 1.9 |
| 2 | 5.4 | 6.3 |
| 3 | 5.2 | 5.6 |
| 4 | 4.7 | 5.0 |
| 5 | 2.7 | 3.0 |
| 6 | 3.3 | 4.5 |

EXAMPLE 3

Example 2 was repeated except tetra(n-butyl)tin (3 g.) was added to the liquid feed. The analysis of the first six samples showed the following product distribution:

| Sample | Percent 6-methyl-1,5-heptadien | Percent 1,5,9-Decatriene |
|---|---|---|
| 1 | 8.2 | 5.2 |
| 2 | 19.1 | 7.2 |
| 3 | 21.4 | 7.5 |
| 4 | 21.7 | 7.9 |
| 5 | 21.7 | 8.3 |
| 6 | 22.5 | 9.5 |

EXAMPLE 4

An 8 percent by weight $Re_2O_7$-$Al_2O_3$ catalyst was prepared by dissolving 4 grams $Re_2O_7$ in 270ml. of aqueous $NH_4OH$ (s.g. =0.88) and loading this solution onto 46 grams of $Al_2O_3$. This catalyst (20 g.) was loaded into a stainless steel reactor tube and activated by heating air at 580°C. for 1 hour and in nitrogen at 580°C. for 1 hour.

A solution of 1,5-hexadiene (82 g.) and tetra(n-butyl)tin (3 g.) in isobutene (427 g.) was then passed through the reactor tube at 40°C. and 120 psig over a period of 95 minutes (Weight Hour Space Velocity = 16). The product stream was collected in a vessel cooled to -78°. The collected product was analyzed by glc and was found to contain (after the exclusion of isobutene) 6-methyl-1,5-heptadiene 7.72 percent and 1,5,9-decatriene 11.3 percent.

When this reaction was repeated exactly as above except that the tetrabutyl tin was omitted, the product was found to contain on glc analysis (isobutene was excluded) 6-methyl-1,5-heptadiene 0.37 percent and 1,5,9-decatriene 0.86 percent.

EXAMPLE 5

An 8 percent $Re_2O_7$-$Al_2O_3$ catalyst was prepared and activated as in Example 4.

A solution of 1,5-cyclooctadiene (54 g.) and tetra(n-butyl)tin (3 g.) an isobutene (446 g.) was passed through the reactor tube containing this catalyst (20 g.) at 40° and 120 psig over a period of 100 minutes (WHSV = 15).[1] The product stream was collected at -78°. A sample of the homogeneous product was analyzed by glc and was found to contain (after excluding isobutene), 1,5-hexadiene 1.63 percent, 6-methyl-1,5-heptadiene 4.83 percent, 1,5,9-decatriene 1.69 percent, 2,7-dimethyl-2,6-octadiene 5.2 percent 1,5,9,13-tetradecatetraene 7.9 percent and 1,5-cyclooctadiene 63.8 percent. Other unidentified higher boiling products (8.8 percent) which were apparently higher disproportionation products were also formed.

[1]Weight Hour Space Velocity

EXAMPLE 6

An 8 percent $Re_2O_7$-$Al_2O_3$ catalyst was prepared and activated as in Example 4.

A solution of 1,5,9-cyclododecatriene (mixed isomers) (54 g.) and tetra(n-butyl)tin (3 g.) in isobutene (452 g.) was passed through the reaction tube containing the catalyst (20 g.) at 40° and 120 psig at a Weight Hour Space Velocity =15. After 15 minutes the liquid product stream was sampled. Analysis of this sample by glc showed the following product distribution (after exclusion of isobutene); 1,5-hexadiene 2.4 percent, 6-methyl-1,5-heptadiene 7.2 percent, 1,5,9-decatriene 1.61 percent, 2,7-dimethyl-2,6-octadiene 7.2 percent, 1,5,9,13-tetradecatetraene 3.6 percent and 1,5,9-cyclododecatriene 74.2 percent.

EXAMPLE 7

A solution of tetra(n-butyl)lead (1.3 g.) and n-nonane (1.3 g.) (as an internal glc standard) in 1,5-hexadiene (24.6 g.) was added over a period of 1 hour to a slurry consisting of isobutene (120.5 g.) and 8 percent $Re_2O_7$-$Al_2O_3$ catalyst (5.9 g.) (prepared and activated as in Example 4) contained in a mechanically stirred stainless steel autoclave (capacity 300 ml.) at 40°C. and 125 p.s.i.g. pressure maintained by the inert gas argon. After a further 3 hours under these conditions, coolings to room temperature and filterings afforded a homogeneous product which on analysis by glc was found to contain isobutene 72.58 percent by weight, n-nonane 1.86 percent by weight, 1,5-hexadiene 10.16 percent by weight, 6-methyl-1,5-heptadiene 2.56 percent by weight and 1,5,9,13-tetradecatetraene 6.98 percent by weight. Other unidentified products (5.86 percent by weight) were also formed.

EXAMPLE 8

In a stainless steel reactor tube was placed 25 g. of an 8 percent $Re_2O_7$-$Al_2O_3$ catalyst. The catalyst was activated by heating at 580°C. for 1 hour in a stream of air and for 2 hours in a stream of nitrogen, and then cooled to 40°C.

A mixture of isobutene (500 g.), 1,5-hexadiene (82 g.) and tetra(n-butyl)tin (3 g.) was then passed through the reaction tube at 80 p.s.i.g. over a time of 7 hours. The reaction product was flask distilled to remove the excess isobutene and the residue was distilled to give a fraction b.p. 118°–121°(18.1 g.) which was shown by ir and nmr to be identical to an authentic sample of 6-methyl-1,5-heptadiene.

We claim:

1. A process for preparing 6-methyl-1,5-heptadiene comprising reacting isobutene with an olefin component containing a compound of the formula:

$$R_1-CH=CH-CH_2-CH=CH-R_2$$

wherein $R_1$ and $R_2$ are independently selected from the group consisting of hydrogen, lower alkyl or $R_3-CH=CH-CH_2-CH-$ or taken together form lower alkylene or $-CH_2-CH_2-CH=CH-CH_2-CH_2$; and $R_3$ is lower alkyl; or mixtures of said compounds in the presence of a catalyst system containing activated rhenium oxide on alumina and tetra(lower alkyl)metal wherein the metal is a Group IV-A metal.

2. The process of claim 1 wherein the catalyst contains 0.1 to 40 parts by weight of the said rhenium oxide per 100 parts by weight of the alumina.

3. The process of claim 2 wherein the catalyst system is present in an amount of 0.01 percent to 50 percent by weight based upon the weight of the olefin component.

4. The process of claim 3 wherein the tetra(lower alkyl)metal is present in the catalyst system in an amount of from 0.1 to 60 percent by weight based upon the weight of the catalyst system.

5. The process of claim 3 wherein the tetra(lower alkyl)metal is present in an amount of from 1 to 20 percent by weight of the catalyst system.

6. The process of claim 1 wherein said olefin is 1,5-hexadiene.

7. The process of claim 6 wherein the catalyst contains 0.1 to 40 parts by weight of the said rhenium oxide per 100 parts by weight of alumina.

8. The process of claim 7 wherein the catalyst system is present in an amount of 0.01 to 50 percent by weight based upon the weight of the olefin.

9. The process of claim 1 wherein said olefin is 1,5,9-cyclododecatriene.

10. The process of claim 9 wherein the catalyst contains 0.1 to 40 parts by weight of the said rhenium oxide per 100 parts by weight of the alumina.

11. The process of claim 10 wherein the catalyst system is present in an amount of 0.01 to 50 percent by weight based upon the weight of the olefin.

* * * * *

UNITED STATES PATENT AND TRADEMARK OFFICE
CERTIFICATE OF CORRECTION

PATENT NO. : 3,855,338
DATED : Dec. 17, 1974
INVENTOR(S) : Peter Fitton & Thomas Whitesides It is certified that error appears in the above-identified patent and that said Letters Patent are hereby corrected as shown below:

Col. 7, claim 1, line 40 should be

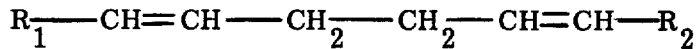

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*